Dec. 29, 1942.                T. KÜMMICH                    2,306,545
           MULTIPLE SPEED CHANGE GEAR, ESPECIALLY FOR MOTOR VEHICLES
                            Filed July 9, 1938
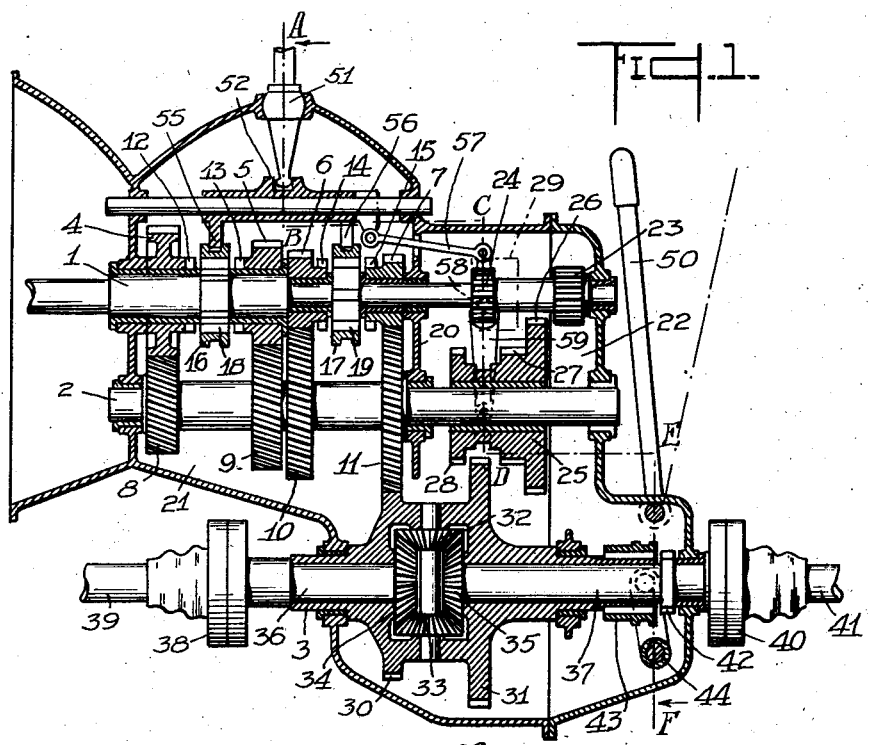
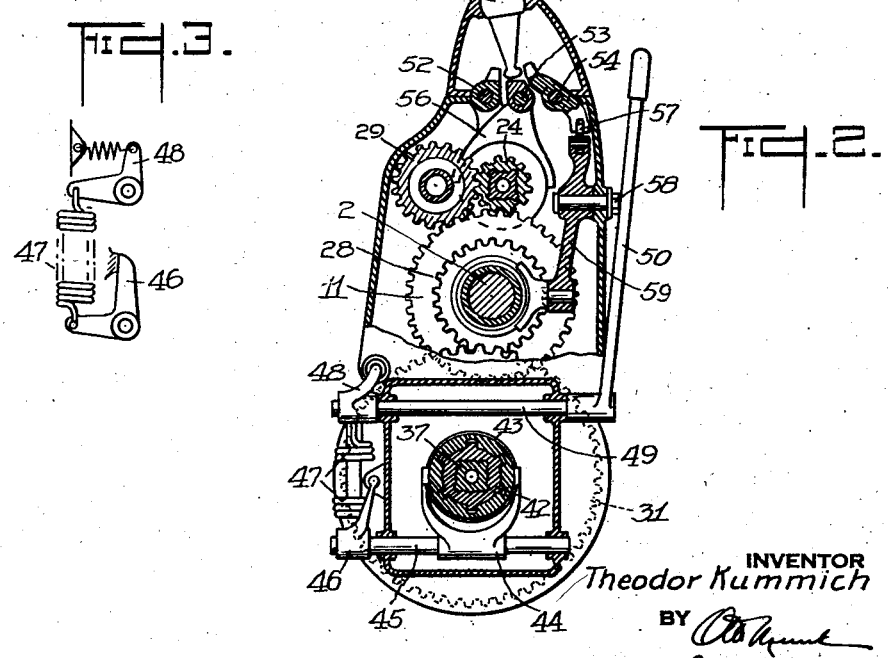
INVENTOR
*Theodor Kummich*
BY
ATTORNEY Patented Dec. 29, 1942

2,306,545

UNITED STATES PATENT OFFICE 2,306,545

MULTIPLE SPEED CHANGE GEAR, ESPECIALLY FOR MOTOR VEHICLES

Theodor Kümmich, Stuttgart, Germany; vested in the Alien Property Custodian

Application July 9, 1938, Serial No. 218,336
In Germany July 12, 1937

16 Claims. (Cl. 74—327)

This invention relates to a multiple speed change gear, especially for motor vehicles with at least three parallel shafts and consists substantially in that, at least two speeds have mutually independent transmission steps for the drive from the driving shaft to the driven shaft over the intermediary shaft. The invention has for its object to provide an advantageous arrangement of gear wheels in such a manner that the dimensions of the gear are as small as possible even when employing a large number of gear steps and at the same time an easy changing is possible. The gear is particularly suitable for direct fitting with a compensating gear which is preferably arranged on the driven shaft. The compensating gear may at the same time serve for the drive of the pair of wheels of one axle or in particularly advantageous manner for the distribution of the drive to both axles of a motor vehicle with four wheel drive.

These advantages are due primarily to the fact that for some speeds the gears on the driving shaft for instance are freely rotatable and may be locked to the shaft by means of clutches. Moreover, these gears are in constant mesh with a corresponding number of gears on the intermediate shaft, while the remaining speeds are obtained by shifting rotatable and loosely mounted gears into or out of engagement with their corresponding gears.

Other advantages of the invention will be described in detail in the following description.

An embodiment of the invention is illustrated by way of example in the accompanying drawing, in which—

Fig. 1 is a longitudinal section through the gear,

Fig. 2 is a section on line A, B, C, D, E, F,

Fig. 3 shows a detail of the gear in elevation.

In the drawing 1 is the driving shaft, 2 the intermediate shaft and 3 the driven shaft which, as hereinafter described, is at the same time constructed as differential of a compensating gear. Gear wheels 4, 5, 6 and 7 are rotatably mounted preferably on shaft 1. On the one hand they are in permanent mesh with gear wheels 8, 9, 10 and 11 rigidly keyed on the intermediate shaft, oblique teeth being preferably used, and on the other hand they have claw teeth 12, 13, 14, 15 which serve for coupling the gear wheels with the driving shaft. For this purpose coupling sleeves 16, 17 are provided which are secured against rotation but shiftable on the driving shaft by means of keys 18 and 19, and, according to whether they are shifted to the right or left, can be coupled with the claws 12 to 15 by means of their keys.

As shown in the drawing, the change speed gear is divided by partition 20 into two chambers 21 and 22, the above mentioned gear wheels being arranged in the chamber 21. The driving shaft 1 and the intermediate shaft 2 are, however, extended beyond the partition 20 and through the chamber 22. Gear wheels 23 and 24 are non-slidably and non-rotatably mounted on the extension of the shaft 1 whereas a sleeve 25 is loosely rotatable and shiftable on the extension of the shaft 2, and carries the gear wheels 26, 27 and 28. On another shaft, not shown in the drawing, another gear wheel 29 is arranged which serves in the usual way for transmitting the reverse speed and permanently meshes with the gear wheel 24. This is effected more particularly by providing a further shaft with a gear wheel rotatably mounted thereon and in permanent engagement with a further rigidly connected gear wheel on the driving shaft, furthermore providing means to engage and disengage the latter gear wheel with a further rigidly connected gear wheel on a rotatable and shiftable sleeve on the intermediate shaft, said sleeve having a further rigidly connected gear wheel. Finally means are provided to engage and disengage this latter gear wheel with a rigidly connected gear wheel on the driven shaft.

Two gear wheels 30 and 31 are also rigidly connected on the driven shaft 3, the gear wheel 30 meshing permanently with the gear wheel 11, whereas the gear wheel 31 can be brought selectively into mesh with the gears 27 and 28 by shifting the sleeve 25. If the gear wheels 28 and 31 are intercoupled an engagement takes place at the same time between the gear wheels 26 and 23; whereas when coupling the gear wheels 31 and 27 the one with the other the gear wheel 26 is brought into mesh with the reverse wheel 29.

As already indicated above, the driven shaft 3 is constructed as a differential. Through the intermediary of bevel wheels 32, 33, 34 and 35 it drives the two driving shafts 36 and 37, the shaft 36 driving for example the front wheels through the intermediary of an intermediate clutch 38 and a Cardan shaft 39, whereas the shaft 37 drives the rear wheels through the intermediary of a clutch 40 and a Cardan shaft 41.

The differential gear is constructed as lockable compensating equalizing gear. For this purpose claws 42 are provided on the shaft 37 and can be engaged with the claws of a clutch sleeve 43 which is provided shiftably but non-rotatably on the driven shaft 3 constructed as a hollow shaft. A lever 44 serves for shifting the clutch sleeve and locking the differential gear, this sleeve, as shown in Figs. 2 and 3, being adjustable by a lever 50 through the intermediary of a shaft 45, a bell crank lever 46, an interposed spring 47, a second ball crank lever 48 and a shaft 49.

The control of the gear is effected by a gear lever 51 which can shift the three change sleeves 52, 53 and 54 in a manner known per se. The change sleeve 52 engages by means of a fork 55 the gear groove in the clutch sleeve 16, whereas the change sleeve 53 engages by means of a fork 56 the gear groove of the clutch sleeve 17.

Furthermore the change sleeve 54 is articulated to a two-armed lever 59 by a rod system 57, this lever being mounted in the casing at 58 and serving for shifting the sleeve 25 with the gear wheels 26, 27 and 28.

In idle running position the driving shaft 1 connected with the engine is practically entirely free from rotating masses, as the gear wheels 4, 5, 6 and 7 are loosely mounted on the shaft. Only the small gear wheels 23 and 24 and the reverse gear wheel 29 rotate with the driving shaft 1. However, a disengagement of the reverse gear wheel 29 for the idle running may be provided if desired.

The following operations are provided for the different speeds:

*1st speed.*—The change sleeve 54 is (according to Fig. 1) shifted towards the left. Thus, through the intermediary of the two-armed lever 59, the sleeve 25 is shifted to the right with the result that the gear wheel 26 comes into mesh with the gear wheel 23 and the gear wheel 28 with the gear wheel 31. The first speed is then formed by the parts 1—23—26—25—28—31—3.

*Reserve speed.*—The reverse speed is engaged in a similar way by shifting the change sleeve 54 to the right, viz., the sleeve 25 to the left, with the result that the gear wheels 26 and 29 on the one hand and 27 and 31 on the other hand are brought into mesh. The drive in this instance takes place by means of the elements 1—24—29—26—27—31—3.

*2nd speed.*—The change sleeve 53 is shifted towards the right with the result that the clutch 17 is brought into engagement with the claws 15. The second speed is then formed by the parts 1—17—15—7—11—30—3. As can be seen, only a single gear wheel 11 on the intermediate shaft is in this instance interposed between the gear wheel 7 on the driving shaft and the gear wheel 30 on the driven shaft.

*3rd speed.*—The change sleeve 53 is shifted towards the left and the clutch 17 engaged with the claws 14. The drive takes place over the parts 1—17—14—6—10—2—11—30—3.

*4th speed.*—The change sleeve 52 is shifted towards the right and the clutch 16 coupled with the claws 13. The drive in this case takes place over the parts 1—16—13—5—9—2—11—30—3.

*5th speed.*—The change sleeve 52 is shifted towards the left and the clutch 16 coupled with the claws 12. The transmission is then formed by the parts 1—16—12—4—8—2—11—30—3.

As can be seen, the driving transmission in the first and reverse speeds is entirely independent of those in the second and fifth speeds. This arrangement possesses the advantage that also the gear wheels for the first speed can be dimensioned independently of the gear wheels of the other forward speeds, for example of the second speed, with the result that the distance between the driving shaft and the intermediate shaft 2 can be less than would otherwise be possible. If, for example, the transmission wheel 26 arranged on the intermediate shaft for the first speed were rigidly connected on the intermediate shaft in the same way as the gear wheels 8—11, and the drive of the first speed were to take place over the pair of gear wheels 11, 30, it would be necessary to make the gear wheel 26 considerably larger than the gear wheel 11 in order to obtain the corresponding ratio of transmission in the first speed. This, however, would be impossible without considerably increasing the distance between the driving shaft and the intermediate shaft. Thus, the entire gear would be much larger and heavier. By the independent drive transmission in the first and reverse speeds on the one hand and in the higher transmission stages on the other hand, this objection is entirely avoided.

It is also particularly advantageous for the changing of the gear that the gear wheels arranged on the driving shaft are partly loosely mounted thereon and partly constructed as gear wheels which can be brought into engagement by shifting. Thus, the mass of the gear part connected with the engine or with the engine clutch is reduced to a minimum, so that changing of gears can take place without difficulty even with viscous gear oil. As moreover only the first and reverse speeds are obtained by means of shiftable gears, whereas the other higher transmission speeds chiefly to be engaged in the travelling service are formed by permanently meshing gear wheels (preferably with helical teeth), a good quiet running of the gear is ensured. The fact that the shafts 1 and 2 are additionally journalled in the partition 20 also contributes to this. The shafts preferably run in roller or ball bearings which, however, have been omitted from the drawing for the sake of clearness.

The changing is further facilitated by the use of the claw clutches 16 and 17 which, if desired, might also be provided with oblique toothed repulse claw clutches which are brought into engagement with corresponding claws on the gear wheels 4—7.

Having now particularly described and ascertained the nature of my said invention and in what manner the same is to be performed, I declare that what I claim is:

1. A change speed transmission comprising a driving shaft, an intermediate shaft and a driven shaft, a first gear disposed on said driving shaft and adapted to rotate independently of the driving shaft, means for locking said first gear to the driving shaft, a second gear fast on said driving shaft, a third gear fast on said intermediate shaft and adapted to mesh with said first gear, a fourth gear freely rotatable and shiftable on said intermediate shaft and adapted to mesh with said second gear, a fifth gear on the driven shaft in mesh with said third gear, a sixth gear on the driven shaft adapted to cooperate with said fourth gear, said fourth gear being adapted to be shifted into simultaneous engagement with or disengagement from said second and sixth gears whereby two independent transmission steps are obtained, power being transmitted from the first gear to the third gear to the fifth gear, on the one hand, and from the second gear to the fourth gear to the sixth gear, on the other hand, depending upon the position of said shiftable fourth gear and said locking means.

2. The device claimed in claim 1, comprising a seventh gear fast on said driving shaft, and a reverse gear in mesh therewith, said reverse gear being adapted to mesh with said fourth gear.

3. The device claimed in claim 1, which comprises a seventh gear fast on said driving shaft, and a reverse gear in mesh therewith, said reverse gear being adapted to mesh with said fourth gear, and in which said first, third and fifth gears are in constant mesh, and said fourth gear, which is freely rotatable and shiftable on said intermediate shaft is adapted for cooperation with the second and reverse gears, respectively.

4. The device claimed in claim 1, in which a plurality of gears are loosely mounted on said driving shaft and a corresponding number of gears in mesh therewith are provided on said intermediate shaft, and further means for locking said loose gears on the driving shaft.

5. In a change speed transmission, a driving shaft, a first driving gear loose on said driving shaft and a second driving gear permanently keyed to said driving shaft, a first intermediate gear adapted to be driven by said first driving gear, a second intermediate gear adapted to be driven by said second driving gear, a first driven gear adapted to be driven by said first intermediate gear, a second driven gear adapted to be driven by said second intermediate gear, first means for connecting said driving shaft and said first driving, first intermediate and first driven gears, to interlock the same for power transmission from the first driving gear to the first driven gear, or for releasing the same for idling; and second means for connecting the driving shaft and said second driving, second intermediate and second driven gears to interlock the same for power transmission from the second driving gear to said second driven gear or for releasing the same for idling; whereby power is transmitted either over said first gear or said second gears, depending upon actuation of said first or second connecting means.

6. The device claimed in claim 5, in which said first and second driven gears form a unit.

7. The device claimed in claim 5, in which said second intermediate gear is adapted for relative movement with respect to said second driving and second driven gears.

8. A change speed transmission comprising a driving shaft, a first intermediate member, a second intermediate member axially aligned to said first intermediate shaft and independently rotatable with respect to the latter, a driven shaft, a first gear disposed on said driving shaft, a second gear on said driving shaft, a third gear on said first intermediate member and adapted to cooperate with said first gear, a fourth gear on said second intermediate member independently rotatable with respect to said third gear and adapted to mesh with said second gear, a fifth gear on the driven shaft adapted to mesh with said third gear, a sixth gear on the driven shaft, adapted to cooperate with said fourth gear, whereby two independent transmission steps are obtained, power being transmitted from the first gear to the third gear to the fifth gear, on the one hand, and from the second gear to the fourth gear to the sixth gear, on the other hand.

9. A change speed transmission according to claim 8 in combination with a seventh gear on the first intermediate member adapted to mesh with said first gear for obtaining said transmission step from said first gear by means of the seventh gear and the third gear to the fifth gear, and an eighth gear on said second intermediate member adapted to mesh with the sixth gear for obtaining said other transmission step independently from said first transmission step from said second gear by means of said fourth gear and said eighth gear to said sixth gear.

10. The device claimed in claim 8, which comprises a seventh gear fast on said driving shaft, and a reverse gear in mesh therewith, said reverse gear being adapted to mesh with said fourth gear, and in which said first, third and fifth gears are in constant mesh, and said fourth gear, which is freely rotatable and shiftable with respect to said first intermediate member, is adapted for cooperation with the second and reverse gears, respectively.

11. A change speed transmission according to claim 8 in combination with at least a further pair of gears in mesh with one another, one of said gears arranged on the driving shaft and the other one on the said first intermediate member.

12. A change speed transmission comprising a driving shaft, a first intermediate member, a second intermediate member axially aligned to said first intermediate member and independently rotatable to the latter, a driven shaft, first gears on said driving shaft, first gears arranged on said first intermediate member and adapted to mesh with said first gears on said driving shaft for effecting different transmission ratios, a first gear on said driven shaft and adapted to mesh with one of said first gears on said first intermediate member, at least one additional gear on said driving shaft, at least one gear on said second intermediate member and adapted to mesh with said additional gear on said driving shaft, an additional gear on said second intermediate member non-rotatably coupled with the said first gear on said second intermediate member, but independently rotatable with respect to the first gears on the first intermediate member, an additional gear on the driven shaft and adapted to mesh with said additional gear on said second intermediate member, whereby two independent transmission steps are obtained, power being transmitted from the said first gears on the driving shaft by means of the first gears on the first intermediate member to the said first gear on the driven shaft on the one hand, and from the said additional gear on the driving shaft by means of the gears on the second intermediate member to the said additional gear on the driven shaft.

13. A change speed transmission according to claim 12, in which the said first gears on the driving shaft and the first gears on the first intermediate member constantly mesh with one another, one gear of each pair of meshing gears being fast on its shaft, with means for coupling the other one of said gears with its shaft, one of said additional gears on said driving shaft and on said second intermediate member being formed as shiftable gears and being shiftable to interengage with the said additional gear on the driven shaft.

14. A change speed transmission according to claim 12, in which the said first gears on the driving shaft, the gears on the first intermediate member and the said first gear on the driven shaft are so dimensioned as to define the higher speeds and in which the said additional gear on the driving shaft, the gears on the second intermediate member and said additional gear on the driven shaft are so dimensioned as to define at least one lower speed.

15. A change speed transmission according to claim 12, in which the said first gears on the driving shaft, the gears on the first intermediate member, and the said first gear on the driven shaft are so dimensioned as to define the higher speeds and in which said additional gear on said second intermediate member has a lesser diameter than said other gear on said second intermediate member and in which said additional gear on said driven shaft has a larger diameter than said first gear on said driven shaft.

16. A change speed transmission comprising a driving shaft, a first intermediate member, a second intermediate member axially aligned with said first intermediate member and independently rotatable with respect to the latter, a driven member, a first gear disposed on said driving shaft, a second gear on said driving shaft, a third gear on said first intermediate member and adapted to cooperate with said first gear, a fourth gear on said second intermediate member independently rotatable with respect to said third gear and adapted to mesh with said second gear, a fifth gear on the driven member adapted to mesh with said third gear, a sixth gear on the driven member adapted to cooperate with said fourth gear, whereby two independent transmission steps are obtained, power being transmitted from the first gear to the third gear to the fifth gear, on the one hand, and from the second gear to the fourth gear to the sixth gear on the other hand, said driven member forming a differential supporting body, a differential gear carried by said body, two driven shafts, a complementary gear on each shaft cooperating with said differential gear, said differential and complementary gears transmitting power from said driven supporting body to said driven shafts.

THEODOR KÜMMICH.